United States Patent
Park et al.

(10) Patent No.: US 7,974,217 B2
(45) Date of Patent: Jul. 5, 2011

(54) METHOD AND APPARATUS FOR IDENTIFYING NETWORK DEVICE CORRESPONDING TO INTERNET PROTOCOL ADDRESS, AND METHOD AND APPARATUS FOR ALLOCATING INTERNET PROTOCOL ADDRESS

(75) Inventors: Hyun-wook Park, Gwacheon-si (KR); Chung-mo An, Gwanak-gu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1193 days.

(21) Appl. No.: 11/183,970

(22) Filed: Jul. 19, 2005

(65) Prior Publication Data

US 2006/0013150 A1 Jan. 19, 2006

(30) Foreign Application Priority Data

Jul. 19, 2004 (KR) .................. 10-2004-0056092
Jul. 27, 2004 (KR) .................. 10-2004-0058794

(51) Int. Cl.
*H04L 12/56* (2006.01)
(52) U.S. Cl. ........ 370/254; 370/253; 370/255; 370/328; 370/389; 370/401; 709/223; 709/228; 709/229; 709/230
(58) Field of Classification Search .......... 370/253–255, 370/328, 389, 401; 709/229, 230, 223, 228, 709/245
See application file for complete search history.

(56) References Cited

U.S. PATENT DOCUMENTS

| | | | |
|---|---|---|---|
| 5,805,926 A | | 9/1998 | Le Van Suu |
| 6,754,321 B1* | | 6/2004 | Innes et al. .............. 379/201.03 |
| 7,266,090 B2* | | 9/2007 | Sawada et al. .............. 370/254 |
| 7,376,745 B2* | | 5/2008 | Shitano et al. .............. 709/229 |
| 7,379,459 B2* | | 5/2008 | Ohnishi .............. 370/392 |
| 7,461,251 B2* | | 12/2008 | Oishi .............. 713/162 |
| 7,627,660 B2* | | 12/2009 | Naitoh .............. 709/223 |
| 2004/0141511 A1* | | 7/2004 | Rune et al. .............. 370/401 |
| 2005/0138193 A1* | | 6/2005 | Encarnacion et al. .............. 709/230 |
| 2006/0129694 A1* | | 6/2006 | Ishida et al. .............. 709/238 |

FOREIGN PATENT DOCUMENTS

| | | |
|---|---|---|
| JP | 61-063132 | 4/1986 |
| JP | 2001-119399 | 4/2001 |
| JP | 2003-069599 | 3/2003 |
| JP | 2003-134145 | 5/2003 |
| JP | 2003-348116 | 12/2003 |
| KR | 100258963 | 3/2000 |
| KR | 2001-0093265 | 10/2001 |
| KR | 10-2002-0011029 | 2/2002 |
| KR | 1020020022317 | 3/2002 |
| KR | 1020020074322 | 9/2002 |

(Continued)

*Primary Examiner* — Robert W Wilson
*Assistant Examiner* — Mohamed Kamara
(74) *Attorney, Agent, or Firm* — Roylance, Abrams, Berdo & Goodman, LLP

(57) ABSTRACT

Provided are a method and apparatus for identifying a network device corresponding to an Internet protocol address. The method comprises the steps of detecting network devices over a network using a detection message, extracting media access control addresses from Internet protocol addresses of network devices which respond to the detection message, and detecting and displaying names of network devices corresponding to the extracted media access control addresses from a database which stores device identification information specifying names of network devices and media access control addresses corresponding to the respective names.

13 Claims, 9 Drawing Sheets

FOREIGN PATENT DOCUMENTS

| | | |
|---|---|---|
| KR | 10-2002-0080788 | 10/2002 |
| KR | 1020030000269 | 1/2003 |
| KR | 1020030004947 | 1/2003 |
| KR | 1020030040268 | 5/2003 |
| KR | 1020030093428 | 12/2003 |
| KR | 1020040017566 | 2/2004 |

\* cited by examiner

FIG. 8

| TYPE OF NETWORK DEVICE | TV ▼ |
| --- | --- |
| | TV |
| | DVD |
| | Air Conditioner |
| | Refregerator |
| | Computer |
| | Printer |
| DEVICE TYPE CODE | 1001 |
| MAXIMUM NUMBER OF NETWORK DEVICES | 100 |

| MAC ADDRESS | 0000F0A01234 |
| --- | --- |
| TYPE OF NETWORK DEVICE | TV ▼ |
| | TV |
| | DVD |
| | Air Conditioner |
| | Refregerator |
| | Computer |
| | Printer |

— 900

| 128 | | | 0 |
|---|---|---|---|
| PREFIX | SUBNET ID | DEVICE TYPE CODE | MAXIMUM NUMBER OF NETWORK DEVICES |

METHOD AND APPARATUS FOR IDENTIFYING NETWORK DEVICE CORRESPONDING TO INTERNET PROTOCOL ADDRESS, AND METHOD AND APPARATUS FOR ALLOCATING INTERNET PROTOCOL ADDRESS

CROSS-REFERENCE TO RELATED PATENT APPLICATIONS

This application claims the priority of Korean Patent Application Nos. 10-2004-0056092 and 10-2004-0058794, filed on Jul. 19, 2004 and Jul. 27, 2004, respectively, in the Korean Intellectual Property Office, the entire disclosures of which are hereby incorporated by reference.

BACKGROUND OF THE INVENTION

1. Field of the Invention

The present invention relates to a network device with an Internet protocol (IP) address, and more particularly, to a method and apparatus for identifying a network device corresponding to an IP address that identifies the network device on a network, and a method and apparatus for allocating an IP address to a network device.

2. Description of the Related Art

FIG. 1 illustrates network devices, such as a DVD player 12, a refrigerator 14, a personal computer 16, a television (TV) 18, and a printer 20, which are connected to a dynamic host configuration protocol (DHCP) server 22 over the Internet. The DVD player 12, the refrigerator 14, the personal computer 16, the TV 18, and the printer 20 connected to a hub 10 are given their own Internet protocol (IP) addresses.

An IP address is a bit stream of typically 32 bits that allows a transmitter and a transmission line to be identified during communications according to a Transmission Control Protocol/Internet Protocol (TCP/IP). In general, the IP address is expressed with four decimal numbers, each representing 8 bits, separated by periods. The IP address is classified into a network address and the address of a computer connected to a network.

Internet Protocol version 6 (IPv6) is a next-generation protocol designed to replace Internet Protocol version 4 (IPv4) of 32 bits. The IPv6 protocol provides a much larger global address space, which is 128 bits, than its predecessor, referred to as IPv4, thus improving the scalability of a communication network. The IPv6 protocol is also referred to as Internet Protocol next generation (IPng). The IPv6 protocol improves the scalability of a communication network for connection of various types of electronic devices, such as DVD players 12, refrigerators 14, personal computers 16, TVs 18, and printers 20 of FIG. 1, to the Internet.

According to IPv6, IP addresses are allocated to network devices using stateless auto-configuration or stateful auto-configuration so that they can be connected to the Internet.

In stateless auto-configuration, a network device creates its own IP address. In this case, the IP address starts with "FE80" or information received from a router as a default, followed by a media access control (MAC) address of the network device. A MAC address indicates a physical address of network device on the Ethernet. In general, a MAC address is 48 bits long and recorded on a ROM of a network interface card (NIC) of a local area network (LAN), installed in a personal computer or a LAN device. A name and address of the transmitter are included in a header of a data frame of the MAC address. For instance, when the MAC address is "00:50:DA: 89:D8:FC", the IPv6 address created according to stateless auto-configuration is "fe80::250:daff:fe89:d8fc".

In stateful auto-configuration, an IP address is allocated from a dynamic host configuration protocol (DHCP) server. Referring to FIG. 1, configuration information required to perform the TCP/IP communication is automatically allocated to a related network device and managed by the DHCP server 22. In the stateful auto-configuration, a network device requests the DHCP server 22 to allocate an IP address to it. Then, the DHCP server 22 checks the MAC address of the network device, and provides the network device with an IP address predetermined by a network manager. Next, the network device sets the allocated IP address as its IP address.

However, since an IP address of IPv6 is expressed with 128 bits, it is not easy for a user to memorize the IP address allocated to a network applicant that the user desires to use that has been converted from an IP address of IPv4. Also, when a network device that a network applicant desires to use does not use a protocol such as a Simple Network Management Protocol (SNMP) that allows detection of network devices, the user experiences difficulties detecting the network device.

Accordingly, it is impossible to determine the type of a network device only using an IP address allocated to the network device.

SUMMARY OF THE INVENTION

Embodiments of the present invention provide a method of identifying a network device corresponding to an Internet Protocol (IP) address created according to Internet protocol version 6 (IPv6).

Embodiments of the present invention also provide an apparatus for identifying a network device corresponding to an IP address created according to Internet Protocol version 6 (IPv6).

Embodiments of the present invention also provide a method of allocating to a network device an IP address that identifies the network device on the Internet.

Embodiments of the present invention also provide an apparatus for allocating to a network device an IP address that identifies the network device on the Internet.

According to one aspect of the present invention, there is provided a method of identifying a network device corresponding to an Internet Protocol address, the method comprising the steps of detecting network devices over a network using a detection message, extracting media access control addresses from Internet protocol addresses of network devices which respond to the detection message, and detecting and displaying names of network devices corresponding to the extracted media access control addresses from a database which stores device identification information specifying names of network devices and media access control addresses corresponding to the respective names.

According to another aspect of the present invention, there is provided an apparatus for identifying a network device corresponding to an Internet protocol address, the apparatus comprising a device detecting unit for transmitting a detection message to network devices connected to a wired or wireless local area network via the wired or wireless local network device, the detection message allowing detection of the network devices; a media access control address extracting unit for extracting media access control addresses from Internet protocol addresses of network devices which respond to the detection message, respectively; a network device name detecting unit for detecting names of network devices corresponding to the extracted media access control addresses from a database storing device identification information which specifies the names of network devices and media access control addresses corresponding to the respective names; and a displaying unit for displaying the detected names of network devices.

According to yet another aspect of the present invention, there is provided a method of allocating an Internet protocol address to a network device, the method comprising the steps of setting a device type code and maximum number of network devices that can be allocated with Internet protocol addresses according to the types of network devices; receiving media access control addresses and types of network devices and creating an Internet protocol address of each of the network devices using a related device type code; matching the media access control addresses of the network devices with the created Internet protocol addresses, respectively; and allocating to a particular network device an Internet protocol address corresponding to a media access control address of the particular network device in response to a request for allocation of an Internet protocol address to the particular network device.

According to still another aspect of the present invention, there is provided an apparatus for allocating an Internet protocol address to a network device, the apparatus comprising a device information setting unit for setting a device type code and maximum number of network devices that can be allocated with Internet protocol addresses according to the types of network devices; an address creating unit for receiving media access control addresses and types of network devices and creating an Internet protocol address of each of the network devices using a relating device type code; a media access control address matching unit for matching the media access control addresses of the network devices with the created Internet protocol addresses, respectively; and an address allocating unit for allocating to a particular network device an Internet protocol address corresponding to a media access control address of the particular network device in response to a request for allocation of an Internet protocol address to the particular network device.

BRIEF DESCRIPTION OF THE DRAWINGS

The above and other aspects and advantages of the present invention will become more apparent by describing in detail exemplary embodiments thereof with reference to the attached drawings in which:

FIG. 8 illustrates an example of a window used to input a device type code and a maximum number of network devices that can be allocated with IP addresses according to an embodiment of the present invention;

FIG. 9 illustrates an example of a window used to input a media access control (MAC) address and type of a network device according to an embodiment of the present invention;

Throughout the drawings, it should be understood that like reference numbers refer to like features, structures and elements

DETAILED DESCRIPTION OF EXEMPLARY EMBODIMENTS

Figure 2:
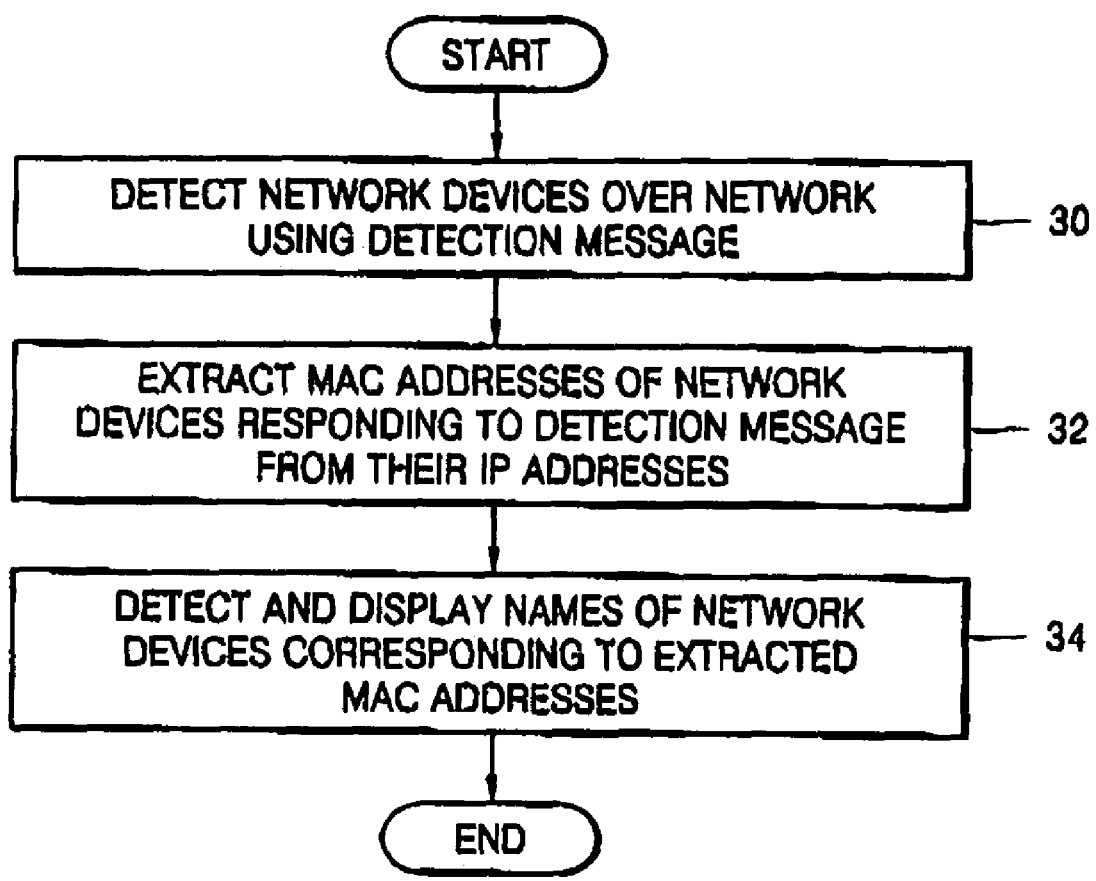
FIG. 2 is a flowchart illustrating a method for identifying a network device corresponding to an Internet protocol (IP) address according to an embodiment of the present invention.

A method of identifying a network device corresponding to an Internet protocol (IP) address according to an embodiment of the present invention will now be described with reference to FIG. 2. FIG. 2 is a flowchart illustrating a method for identifying a network device corresponding to an IP address according to an embodiment of the present invention. The method of FIG. 2 comprises operations 30 through 34 for detecting network devices corresponding to media access control (MAC) addresses extracted from IP addresses and displaying the names of the detected network devices.

Figure 1:
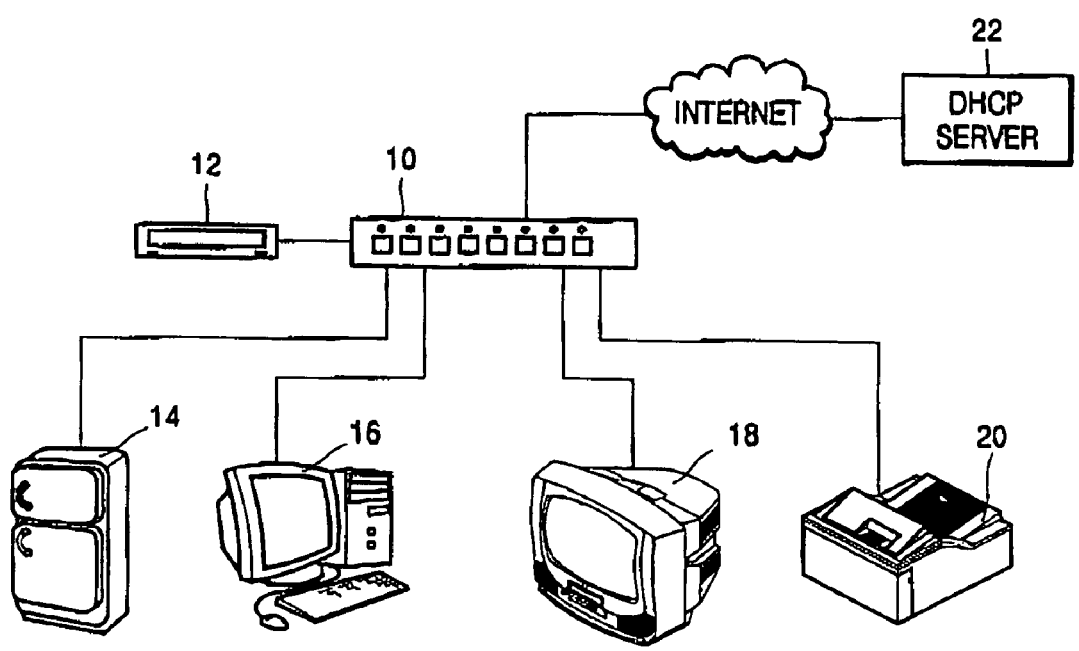
FIG. 1 illustrates network devices and a dynamic host configuration protocol (DHCP) server connected to a network.

Specifically, network devices connected to a network are detected using a detection message (operation 30). Operation 30 will be described in greater detail using the DVD player 12, the refrigerator 14, the personal computer 16, the TV 18, and the printer 20 shown in FIG. 1. When a user requests a host (not shown) connected to the hub 10 of FIG. 1 to display the names of particular network devices, the host transmits the detection message to the DVD player 12, the refrigerator 14, the personal computer 16, the TV 18, and the printer 20 connected to the network so as to detect network devices connected to the network. The detection message allows network devices, such as the DVD player 12, the refrigerator 14, the personal computer 16, the TV 18, and the printer 20 connected to the hub 10, to be detected. An all node multicast method is used to transmit the detection message to the network devices.

After operation 30, the MAC addresses of network devices responding to the detection message are extracted from their IP addresses (operation 32). The network devices responding to the detection message are connected to a wired or wireless local area network (LAN) connected to the host. The network devices responding to the detection message provide their IP addresses to the host.

The IP addresses of the network devices are determined according to Internet protocol version 6 (IPv6), which is a next generation protocol. The IPv6 protocol defines three types of methods for transmitting an IP address, which are by a unicast, which is communication between one host and another host, an anycast, which is communication between one host and several hosts near the host, and a multi-cast, which is between one host and multiple hosts. The IPv6 protocol allows designation of a mechanism that authenticates a packet source and guarantees the integrity and secrecy of data using an expansion of a header.

In this disclosure, an IP address allocated according to IPv6 is allocated by stateless auto-configuration, which allows a network device to create its own IP address. Such an IP address contains the MAC address of the network device. Thus, a host can extract MAC addresses of network devices from IP addresses received from the network devices.

If the IP address received from a network device is "fe80:: 250:daff:fe89:d8fc", a MAC address reading "00:50:DA:89: D8:FC" is extracted from the IP address.

After operation 32, the names of network devices corresponding to the extracted MAC addresses are detected and displayed, using a database that preferably includes device identification information specifying the names of network devices on a network and MAC addresses corresponding to the network device names (operation 34). Here, the names of network devices preferably include manufacturer names and product names of network devices, respectively.

Accordingly, it is possible to detect the names of network devices corresponding to the MAC addresses extracted in operation 32 by matching the MAC addresses and the device identification information.

When the names of network devices are displayed, at least one of the IP addresses, device manufacturer names, and device product names is also displayed.

Figure 3:
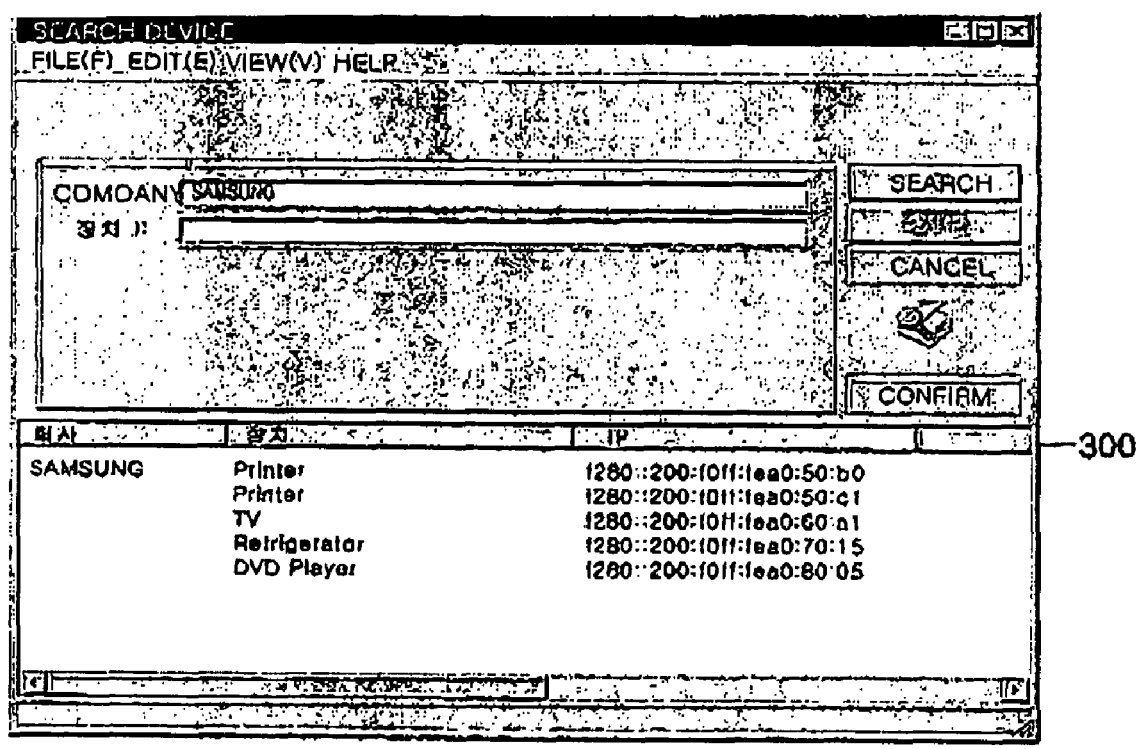
FIG. 3 illustrates examples of network devices detected using the method of FIG. 2.

FIG. 3 illustrates an exemplary window for displaying examples of network devices detected using the method shown in FIG. 2. When a user desires to detect network devices manufactured by Samsung, for example, among network devices that use IPv6 on a network, the user requests them to be displayed. Then, a plurality of network appliances manufactured by Samsung and their IP addresses are displayed in user interface 300 by performing operations 30 through 34 of FIG. 2, as shown in FIG. 3. Accordingly, the user can easily identify a network device and its IP address using the method of FIG. 2.

Figure 4:
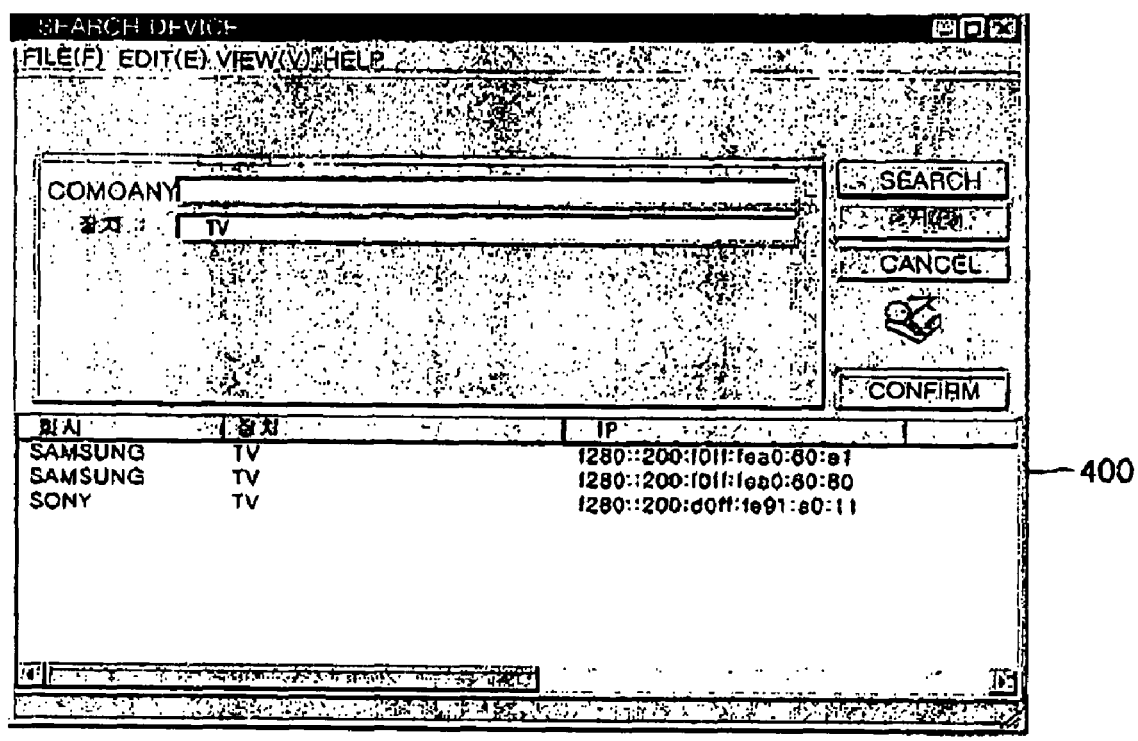
FIG. 4 illustrates other examples of network devices detected using the method of FIG. 2.

FIG. 4 illustrates another exemplary window displaying examples of network devices detected using the method shown in FIG. 2. When a user desires to detect televisions (TVs) from among the network devices that use IPv6 on a network, the user requests for the TVs to be displayed. Then, a plurality of TVs connected to the network and their IP addresses are displayed in window 400 by performing operations 30 through 34, as shown in FIG. 4.

Figure 5A:
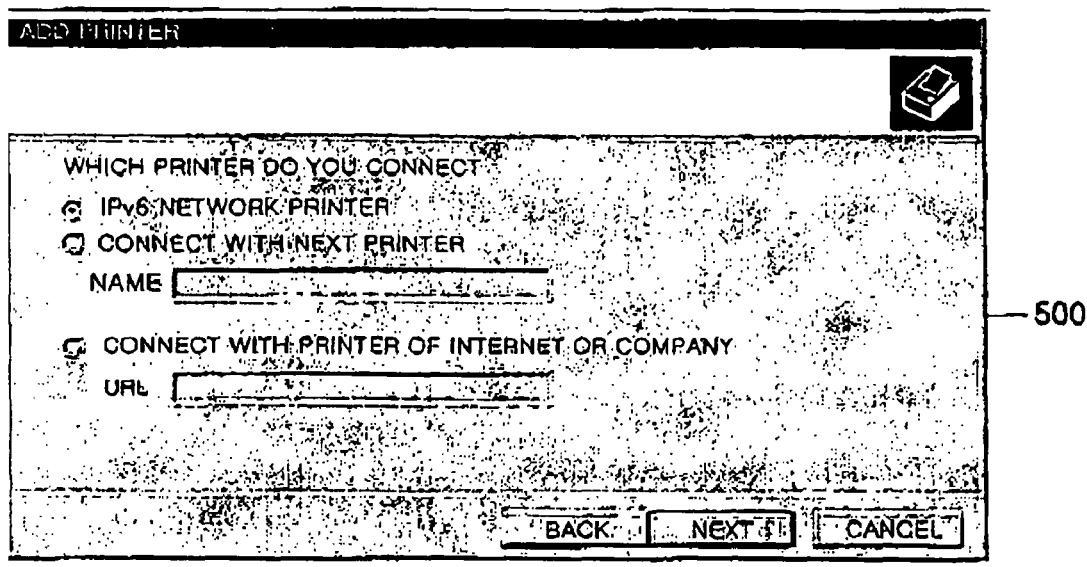
FIGS. 5A and 5B illustrate the forming of a network among network devices detected using the method of FIG. 2 according to an embodiment of the present invention.
Figure 5B:
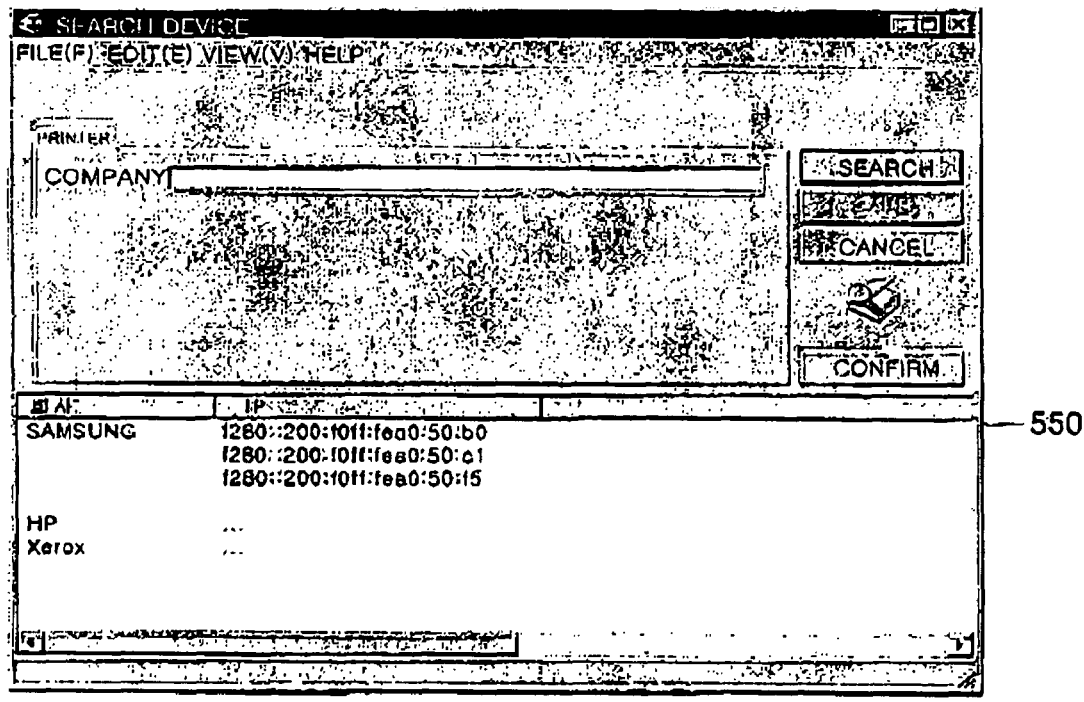

FIGS. 5A and 5B illustrate the forming of a network among network devices using the method shown in FIG. 2, according to an embodiment of the present invention. The method of FIGS. 5A and 5B removes the need for a user to input an IP address when adding a printer over a network.

Specifically, FIG. 5A illustrates an example of a user interface 500 for requesting the display of network printers which are allocated with an IP address of IPv6. FIG. 5B illustrates the exemplary network printers detected and displayed in user interface 550 in response to a user request.

According to an embodiment of the present invention, it is possible to extract network printers with IP addresses of IPv6 on a network when adding a network printer over the network. Also, it is possible to easily form a communication network between at least one printer selected among the extracted printers by a user and a host by selecting tge menu item 510.

An apparatus for identifying a network device corresponding to an IP address according to the present invention will now be described with reference to FIG. 6.

Figure 6:
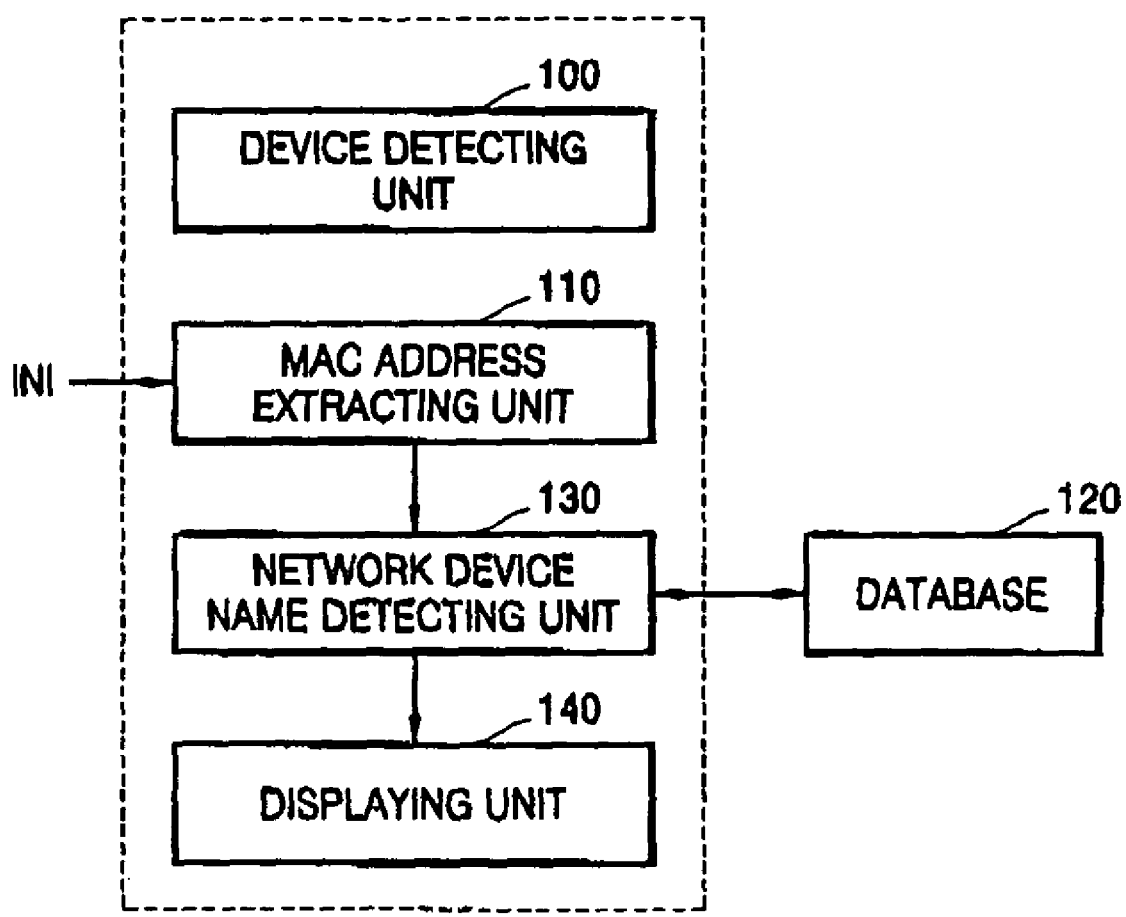
FIG. 6 is a block diagram of an apparatus for identifying a network device corresponding to an IP address according to an embodiment of the present invention.

FIG. 6 is a block diagram of an apparatus for identifying a network device corresponding to an IP address according to an embodiment of the present invention. The apparatus comprises a device detecting unit 100, a MAC address extracting unit 110, a database 120, a network device name detecting unit 130, and a displaying unit 140.

The device detecting unit 100 sends to the network devices via the wired or wireless LAN a detection message that allows the detection of network devices connected to a wired or wireless LAN.

The MAC address extracting unit 110 extracts MAC addresses from the IP addresses of the network devices responding to the detection message. Here, the IP addresses of the network devices responding to the detection message are determined according to the IPv6 protocol, and allocated to their corresponding network devices using stateless auto-configuration that allows the network devices to create their own IP addresses.

When the IP addresses of the network devices responding to the detection message are input to the MAC address extracting unit 110 via an input terminal IN1, the MAC address extracting unit 110 extracts the MAC addresses from the IP addresses determined by stateless auto-configuration and transmits them to the network device name detecting unit 130.

The database 120 contains device identification information specifying the names and MAC addresses of network devices.

The names of each of the network devices included in the device identification information preferably includes a device manufacturer name and a product name. The device identification information includes MAC addresses corresponding to the network device names, respectively.

The database 120 may be included in a host (not shown) connected to a network, an image forming apparatus (not shown), or a server (not shown) connected to the network.

The network device name detecting unit 130 detects the network device names corresponding to the extracted MAC addresses using the device identification information. When the MAC addresses extracted by the MAC address extracting unit 110 are input to the network device name detecting unit 130, the network device name detecting unit 130 requests the database 120 to provide it with the device identification information.

The network device name detecting unit 130 requests the database 120 to send the device identification information when the database 120 is included in a host (not shown). Alternatively, the network device name detecting unit 130 requests a server (not shown) connected to the network to send the device identification information when the database 120 is included in the server. Upon receiving the device identification information from the database 120 by either means, the network device name detecting unit 130 detects the network device names corresponding to the extracted MAC addresses from the received device identification information, and outputs the detected network device names to the displaying unit 140.

After receiving the network device names from the network device name detecting unit 130, the displaying unit 140 displays the names of network devices requested by the user. When displaying the names of network devices, at least one of the IP address, manufacturer name, and product name of each of the network devices is displayed.

The apparatus of FIG. 6 can be installed in a host, an image forming apparatus, or a server connected to a wired or wireless LAN.

A method for allocating an IP address to a network device according to an embodiment of the present invention will now be described with reference to FIG. 7.

Figure 7:
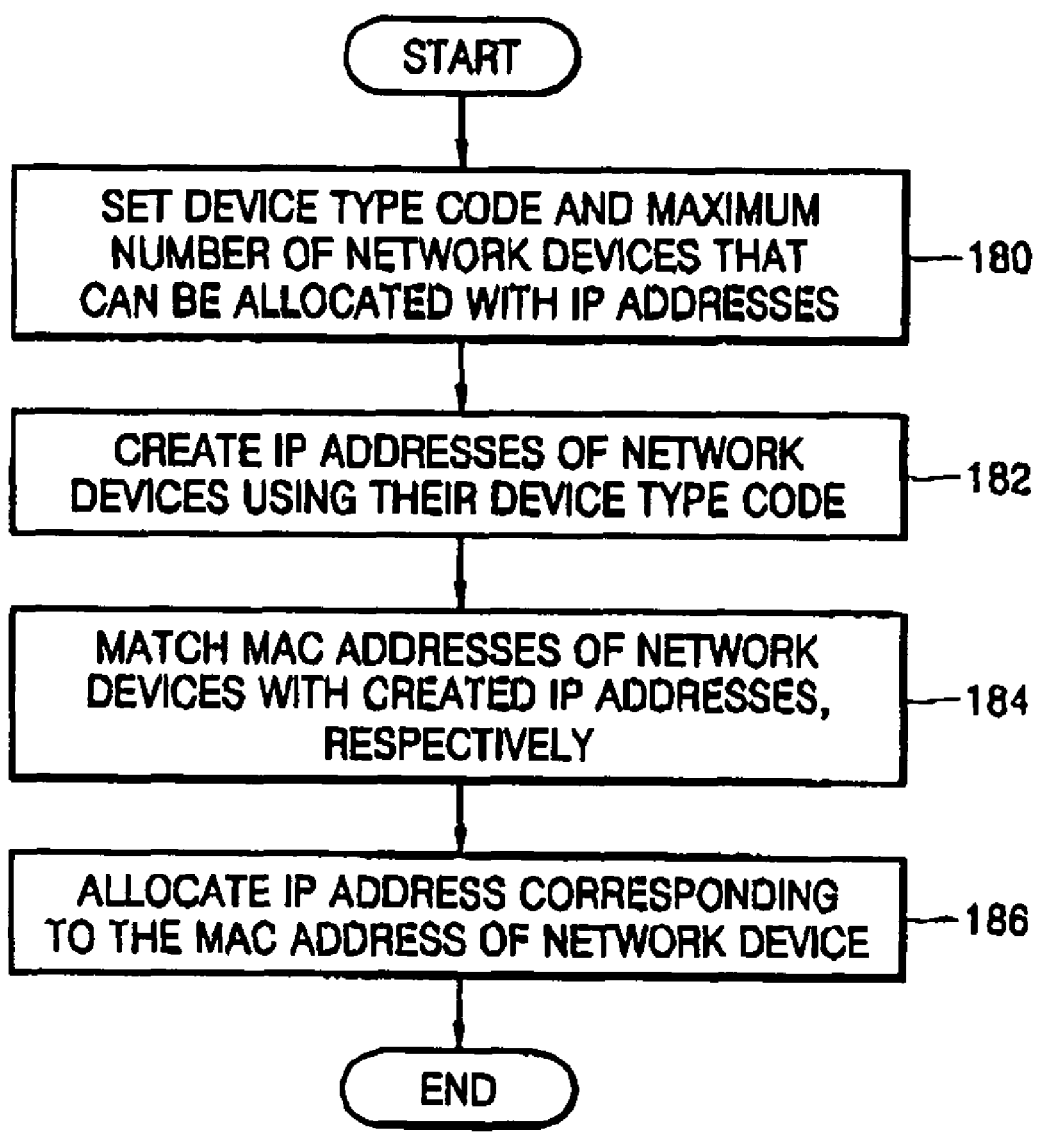
FIG. 7 is a flowchart illustrating a method for allocating an IP address to a network device according to an embodiment of the present invention.

FIG. 7 is a flowchart illustrating a method for allocating an IP address to a network device according to an embodiment of the present invention. Referring to FIG. 7, a code for the type of network device and a maximum number of network devices that can be allocated with IP addresses are determined (operation 180). In operation 180, a network manager sets an IP pool in a dynamic host configuration protocol (DHCP) server. That is, the codes for the types of network devices that differentiate the network devices from one another are determined, and a maximum number of network devices that can be given IP addresses, corresponding to the determined codes, are set.

FIG. 8 illustrates an example of a window 800 used to input a device type code and a maximum number of network devices that can be allocated with IP addresses. A network manager can select the type of network device and input the maximum number in the window 800 of FIG. 8. Referring to FIG. 8, a TV, for example, which is a network device selected by a network manager, is given a binary code "1001" as a device type code, and a maximum number of IP addresses allocated to the TV is set to 100.

After operation 180, when the MAC addresses and types of network devices are input, IP addresses of the network devices are created using their device type code (operation 182). That is, when the network manager inputs the MAC addresses and the types of the network devices preferably via the window 800, their IP addresses, which preferably include device type codes corresponding to the input types of network devices, respectively, are created.

FIG. 9 illustrates an example of a window used to input the MAC addresses and types of network devices. A network manager inputs the MAC address and type of network device to the window 900 of FIG. 9. A MAC address is a physical address of a network device on the Ethernet, such as the LAN address of the network device. Referring to FIG. 9, an exemplary MAC address "0000F0A01234" is input to the window for a network device that is a TV.

As described above, when the MAC addresses and the types of network devices are input to a window 900, their IP addresses that include device type codes corresponding to the input types of network devices are created. If the type of network device is a TV, an IP address of the network device is created using the exemplary device type code "1001" of the TV.

An IP address preferably includes a number that is smaller than or equal to a maximum number of network devices that can be allocated with IP addresses, as determined in operation 180. If the type of network device is a TV and the maximum number is 100, a number included in an IP address of the network device must be smaller than or equal to 100. That is, the number of TVs that can be allocated with IP addresses is limited to 100, in this example.

Figures 10, 11:
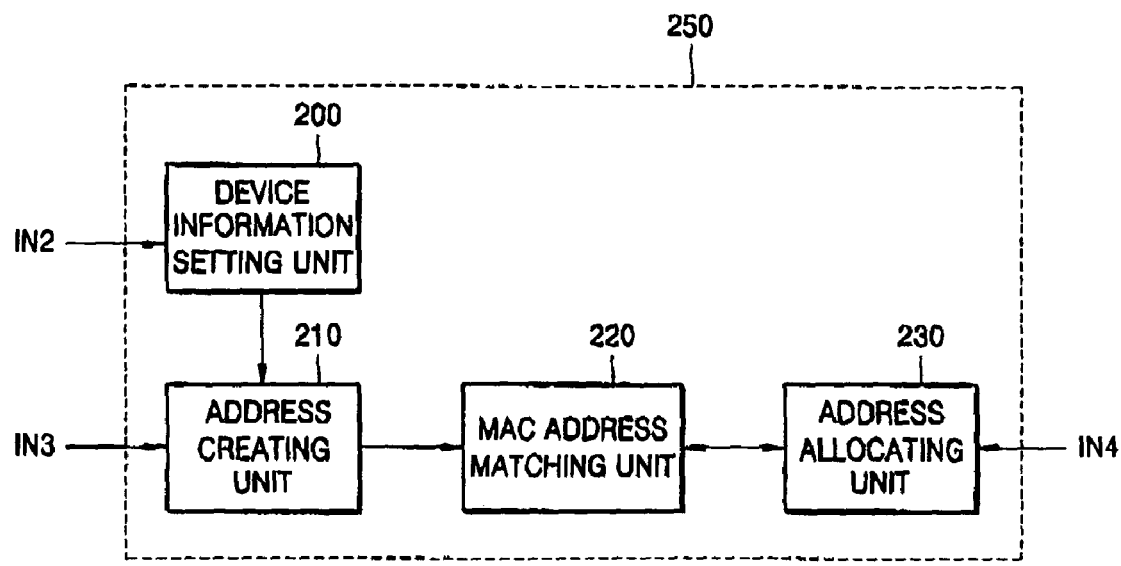
FIG. 10 illustrates a construction of an IP address according to an embodiment of the present invention.
FIG. 11 is a block diagram of an apparatus for allocating an IP address to a network device according to an embodiment of the present invention.

FIG. 10 illustrates the structure of a 128-bit IP address according to an embodiment of the present invention. As shown in FIG. 10, the 128-bit IP address according to an embodiment of the present invention preferably includes a prefix, a subnet identifier (ID), a device type code and a maximum number of network devices of a binary number.

Referring back to FIG. 7, after operation 182, the MAC addresses of network devices are matched with the created IP addresses, respectively (operation 184). Since each of the IP addresses created in operation 182 are created using the input MAC address and the type of each of the network devices, the created IP addresses correspond to the input MAC addresses, respectively.

After operation 184, in response to a user request for allocation of an IP address to a network device, an IP address corresponding to the MAC address of the network device is allocated to the network device (operation 186). More specifically, when a user sends the user request together with the MAC address of the network device, it is determined whether the sent MAC address is included in the MAC addresses matched with the IP addresses in operation 184. When the sent MAC address is included in the matched MAC addresses, an IP address matching the sent MAC address is allocated to the network device.

When the IP address is allocated and provided to the network device, the network device sets the provided IP address as its IP address.

Accordingly, the user can determine the type of network device allocated with the set IP address using a device type code included in the set IP address.

An apparatus for allocating an IP address to a network device according to an embodiment of the present invention will be described with reference to the FIG. 11.

FIG. 11 is a block diagram of an apparatus 250 for allocating an IP address to a network device according to an embodiment of the present invention. The apparatus 250 comprises a device information setting unit 200, an address creating unit 210, a MAC address matching unit 220, and an address allocating unit 230. The device information setting unit 200, the address creating unit 210, the MAC address matching unit 220, and the address allocating unit 230 are also included in the DHCP 22 of FIG. 1.

When receiving a device type code and maximum number of network devices that can be allocated with IP addresses of each of the network devices from a network manager via an input terminal IN2, the device information setting unit 200 sets an IP pool using the device type codes and maximum numbers, and transmits the IP pool to the address creating unit 210. The device information setting unit 200 displays a window such as that shown in FIG. 8. The window 800 provides the network manager with a means to select the type of network device and input a device type code and maximum number of network devices, whereby the device type code is set and maximum number of network devices is set by the network manager as an IP pool.

The address creating unit 210 is provided with the MAC addresses and types of the network devices via an input terminal IN3, and creates IP addresses for the network devices using the device type codes included in the IP pool set by the device information setting unit 200.

The address creating unit 210 displays a window 900 such as that shown in FIG. 9 so the network manager can input the MAC addresses and the types of network devices. The address creating unit 210 creates the IP addresses of the network devices using device type codes corresponding to the types of network devices input by the network manager, and sends the created IP addresses to the MAC address matching unit 220.

During the creation of the IP addresses, a number that is smaller than or equal to the maximum number set by the device information setting unit 200 is included into each of the IP addresses. For instance, when the type of network device is a TV and the maximum number of TVs that can be allocated with IP addresses is 100, for example, the address creating unit 210 determines a number included in the IP address of the network device to be smaller than or equal to 100. That is, the number of TVs that can be allocated with IP addresses is limited to 100.

The MAC address matching unit 220 matches the MAC addresses of network devices with the IP addresses provided by the address creating unit 210. In more detail, upon receiving the IP addresses from the address creating unit 210, the MAC address matching unit 220 matches the MAC addresses input to the address creating unit 210 with the received IP addresses, and outputs the result of the matching to the address allocating unit 230 that requests to receive it.

In response to a request for allocation of an IP address to a network device, the address allocating unit 230 allocates to the network device an IP address corresponding to the MAC address of the network device. In more detail, when a signal indicating the request for allocation is input via an input terminal IN4, the address allocating unit 230 detects the MAC address of the network device transmitted together with the signal. Next, the address allocating unit 230 determines whether the detected MAC address is included in the MAC addresses matched with the IP addresses using the matching unit 220. If the detected MAC address is included in the matched MAC addresses, the address allocating unit 230 allocates an IP address matching the detected MAC address to the network device.

As described above, a method and apparatus for identifying a network device corresponding to an IP address according to embodiments of the present invention make it simpler to determine the manufacturer and type of a network device with an IP address determined according to the IPv6 protocol, thereby allowing a network device to be easily detected or added over a network.

Further, a method and apparatus for allocating a network device an IP address according to embodiments of the present invention make it simpler to determine the type of network device using only an IP address allocated to a network device, since information regarding the types of network devices is inserted into IP addresses when a DHCP server allocates the IP addresses to network devices.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for identifying a network device corresponding to an Internet protocol address, comprising the steps of:
    (a) detecting network devices over a network using a detection message;
    (b) extracting media access control addresses from Internet protocol addresses of the network devices which respond to the detection message; and
    (c) detecting and displaying the names of network devices corresponding to the extracted media access control addresses by matching the extracted media access control addresses with device identification information in a database which stores device identification information specifying names of network devices and media access control addresses corresponding to the respective names,
    wherein the Internet protocol addresses are determined according to added information of Internet protocol version 6.

2. The method of claim 1, wherein the names of each of the network devices stored in the database comprises a manufacturer name and product name of each of the network devices.

3. The method of claim 2, wherein during step (c), at least one of the Internet protocol address, manufacturer name, and product name of each of the network devices is displayed.

4. An apparatus for identifying a network device corresponding to an Internet protocol address, comprising:
    a device detecting unit for transmitting a detection message to network devices connected to a wired or wireless local area network via the wired or wireless local network area, the detection message allowing detection of the network devices;
    a media access control address extracting unit for extracting media access control addresses from Internet protocol addresses of network devices which respond to the detection message, respectively;
    a network device name detecting unit for detecting the names of network devices corresponding to the extracted media access control addresses by matching the extracted media access control addresses with device identification information in a database storing device identification information, which specifies names of network devices and media access control addresses corresponding to the respective names; and
    a displaying unit for displaying the detected names of network devices,
    wherein the Internet protocol addresses are determined according to added information of Internet protocol version 6.

5. The apparatus of claim 4, wherein the names of each of the network devices stored in the database comprises a manufacturer name and product name of each of the network devices.

6. The apparatus of claim 5, wherein when displaying the names of network devices, the display displays at least one of the Internet protocol address, manufacturer name, and product name of each of the network devices.

7. The apparatus of claim 4, wherein the apparatus is installed in one of a host, an image forming apparatus, and a server connected to the wire/wireless local area network.

8. The apparatus of claim 7, wherein the database is installed in one of the host, the image forming apparatus, and the server connected to the wire/wireless local area network.

9. The apparatus of claim 4, wherein the database is installed in a server connected to the wired or wireless local area network.

10. A method for allocating an Internet protocol address to a network device, comprising the steps of:
    (a) setting a device type code and a maximum number of network devices that can be allocated with Internet protocol addresses according to the types of network devices;
    (b) receiving media access control addresses and the types of network devices and creating an Internet protocol address for each of the network devices using a related device type code;
    (c) matching the media access control addresses of the network devices with the created Internet protocol addresses, respectively; and
    (d) allocating a particular network device an Internet protocol address corresponding to the media access control address of the particular network device in response to a request for allocation of an Internet protocol address to the particular network device,
    wherein the Internet protocol addresses are determined according to added information of Internet protocol version 6.

11. The method of claim 10, wherein during step (b), a number that is smaller than or equal to the maximum number is included in each of the created Internet protocol addresses.

12. An apparatus for allocating an Internet protocol address to a network device, comprising:
    a device information setting unit for setting a device type code and a maximum number of network devices that can be allocated with Internet protocol addresses according to the types of network devices;
    an address creating unit for receiving media access control addresses and the types of network devices and creating an Internet protocol address of each of the network devices using a relating device type code;

a media access control address matching unit for matching the media access control addresses of the network devices with the created Internet protocol addresses, respectively; and an address allocating unit for allocating to a particular network device an Internet protocol address corresponding to the media access control address of the particular network device in response to a request for allocation of an Internet protocol address to the particular network device, wherein the Internet protocol addresses are determined according to added information of Internet protocol version 6.

13. The apparatus of claim 12, wherein the address creating unit inserts a number that is smaller than or equal to the maximum number of network devices into each of the created Internet protocol address.

* * * * *